US010454563B2

(12) United States Patent
Lotter

(10) Patent No.: US 10,454,563 B2
(45) Date of Patent: Oct. 22, 2019

(54) SYSTEM AND METHOD FOR ASSIGNING FREQUENCY RESOURCES IN A THREE-HOP REPEATER

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 68 days.

(21) Appl. No.: 14/931,801

(22) Filed: Nov. 3, 2015

(65) Prior Publication Data

US 2016/0128068 A1 May 5, 2016

Related U.S. Application Data

(60) Provisional application No. 62/074,553, filed on Nov. 3, 2014.

(51) Int. Cl.
| | |
|---|---|
| *H04B 7/155* | (2006.01) |
| *H04W 72/04* | (2009.01) |
| *H04W 16/14* | (2009.01) |
| *H04W 24/08* | (2009.01) |
| *H04W 72/08* | (2009.01) |

(52) U.S. Cl.
CPC ........ *H04B 7/15542* (2013.01); *H04W 16/14* (2013.01); *H04W 24/08* (2013.01); *H04W 72/0453* (2013.01); *H04W 72/082* (2013.01)

(58) Field of Classification Search
CPC .......... H04W 72/0453; H04W 72/082; H04W 16/14; H04W 24/08; H04B 7/15542
See application file for complete search history.

(56) References Cited

U.S. PATENT DOCUMENTS

| | | | |
|---|---|---|---|
| 8,300,590 B1 * | 10/2012 | Negus | H04B 7/0691 370/329 |
| 2002/0045461 A1 * | 4/2002 | Bongfeldt | H04B 7/15535 455/522 |
| 2009/0239521 A1 | 9/2009 | Mohebbi | |
| 2010/0284446 A1 | 11/2010 | Mu et al. | |
| 2011/0194486 A1 * | 8/2011 | Fukuzawa | H04B 7/15542 370/315 |
| 2011/0281579 A1 * | 11/2011 | Kummetz | H04B 7/15535 455/424 |
| 2012/0063383 A1 | 3/2012 | Barbieri et al. | |
| 2014/0274193 A1 * | 9/2014 | Ashworth | H04W 52/52 455/522 |

* cited by examiner

*Primary Examiner* — Tejis Daya

(57) ABSTRACT

A system and method for allocating frequency resources in a three-hop repeater are disclosed. Bandwidth can be allocated asymmetrically, and in non-contiguous blocks for the required bandwidth for a transmission operation. Bandwidth is dynamically allocated on an as-needed basis.

12 Claims, 3 Drawing Sheets

SYSTEM AND METHOD FOR ASSIGNING FREQUENCY RESOURCES IN A THREE-HOP REPEATER

CROSS-REFERENCE TO RELATED APPLICATION

This application claims priority under 35 U.S.C. § 119(e) to Provisional Application No. 62/074,553, filed Nov. 3, 2014, titled "SYSTEM AND METHOD FOR ASSIGNING FREQUENCY RESOURCES IN A THREE-HOP REPEATER," the disclosure of which is hereby incorporated by reference herein in its entirety.

BACKGROUND

Three-hop repeaters have proven to be effective instruments in combating weak or no coverage in various environments, such as residential homes and small businesses. A three hop repeater consists of two radiating elements: a donor element and a server element. In one implementation of such a system, the donor element is called a network unit, because this unit connects to a signaling network, and the server element is called a coverage unit, because this unit provides signal coverage inside of a home or business. The donor and server elements are typically separated in distance to allow the repeater to have higher gain than can be achieved in the case of repeater where the donor and server elements are close together or even integrated into one enclosure.

The connection between the donor and server elements can be made using any one of a number of different means. For example, the link can be made using a fiber cable, a copper cable, or wirelessly. In many cases, the available bandwidth on the connection between the donor and server is limited. Typically the way in which the repeater will deal with this is to have less relay bandwidth. Further, conventional repeater systems allocate bandwidth in a symmetrical way on the link between the donor and server elements to ensure than any service offered in the downlink is also offered in the uplink direction.

SUMMARY

This document discloses a system and method to optimize all available resources on the link between the donor and server elements in a three-hop repeater to achieve the maximum relay bandwidth and system utility.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for assigning frequency resources in a three-hop repeater, to optimize all available resources on the link between the donor and server elements of the three-hop repeater to achieve the maximum relay bandwidth and system utility.

Figure 1:
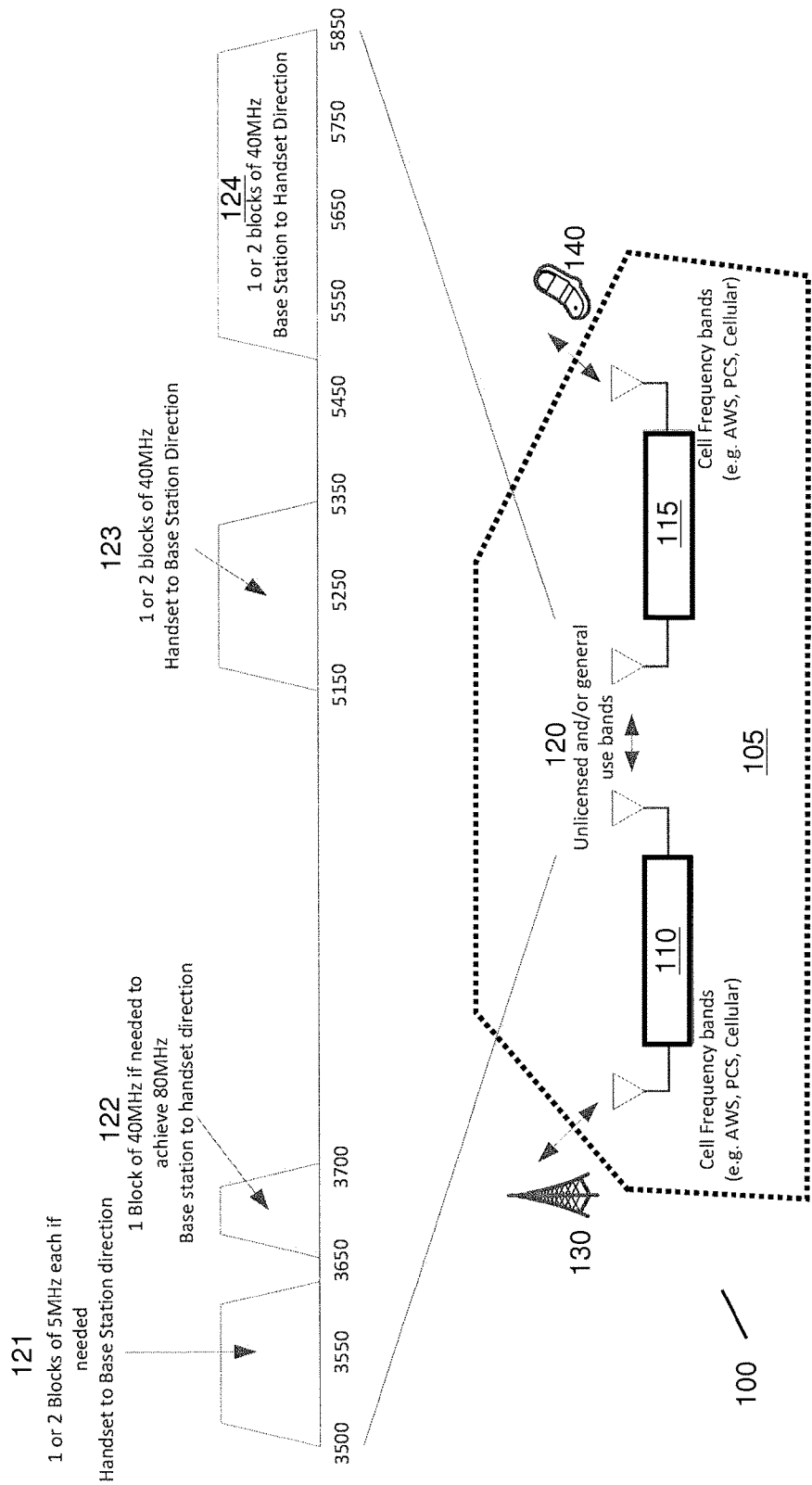
FIG. 1 illustrates a three-hop repeater system for assigning frequency resources.

FIG. 1 illustrates a three-hop repeater system 100 for spectrum allocation between a donor element 110 and a server element 115 of the three-hop repeater system 100. The donor element 110, which is also referred to as the network unit, sends and receives signals from a signaling network 130, for example a cellular phone network. The server unit 115, which is also referred to as the coverage unit, sends and receives signals from a mobile device 140, such as a cellular phone. The bandwidth on the link 120 between the donor 110 and server 115 can be allocated asymmetrically, as opposed to allocating bandwidth in a symmetrical way on this link 120. Further, bandwidth in any direction does not need to be allocated in a contiguous block. Accordingly, the required relay bandwidth can be allocated in more than one block and "re-assembled" in either the donor 110 or server 115 system.

Bandwidth is allocated dynamically on an as needed basis, for example in the system shown in FIG. 1. In other words, not all frequencies may need to be relayed at all times if the system is able to detect the need to relay a frequency in real time and act accordingly. When additional relay bandwidth is needed on link 120, the repeater can find an available spectrum and allocate this available spectrum to link 120 to be used to relay signals through the repeater. For example, the repeater can use spectrum in an approximate 3650-3700 MHz range as part of the relay spectrum used in link 120. As such, the availability check can include a check for other interfering signals in this bandwidth prior to allocation to link 120. This check for interference can be done by the donor system or server system and in some cases the system that conducts the interference check is the one attempting to send or retrieve information. Finally, the system may also be required to register the location of the transmitter, such as if required by FCC regulation.

An example of how the system operates is discussed with respect to the system 100 shown in FIG. 1. In this case, the system 100 operates as follows. The booster 105 will attempt to allocate two 40 MHz blocks 124 between 5470 and 5850 MHz to relay 80 MHz of CMRS (commercial mobile radio service) bandwidth in the downlink direction on link 120. If only one block of 40 MHz could be found in this frequency range due to spectrum congestion, the spectrum in the 3650-3700 MHz range 122 will be used on link 120. Before accessing the spectrum in the 3650-3700 MHz range 122, the system will scan for interference and also automatically register the device for operation in this band at this location by contacting a database designated by the FCC to store the location of transmitters in this frequency band. The large amount of spectrum is required in the downlink to ensure that all CMRS services are made available to handsets in the area with weak or no coverage.

In the uplink direction (handset 140 to base station 115), less spectrum is required as a limited number of handsets 140 in the coverage area of the booster 105 does not use all the available spectrum resources. The system 100 will allocate one 40 MHz spectrum block in the 5150-5350 MHz band 123 to uplink transmissions on link 120. A second band in the 3500-3650 MHz range 121 will be reserved in case more than 40 MHz of uplink bandwidth is required. This reservation will be made by scanning for interference and also checking a database to see what spectrum is available at this location, and registering as a transmitter in this area.

The system 100 will monitor all uplink frequencies that are assigned to the CMRS provider, and upon detecting activity in any band, dynamically use the 40 MHz spectrum in the 5 GHz band to relay the signal to the base station over link 120. Should more than 40 MHz of uplink bandwidth be required, the system will dynamically start using the spectrum in the 3500-3650 MHz range in blocks of 5 MHz as a "spill-over" frequency resource.

Figure 2:
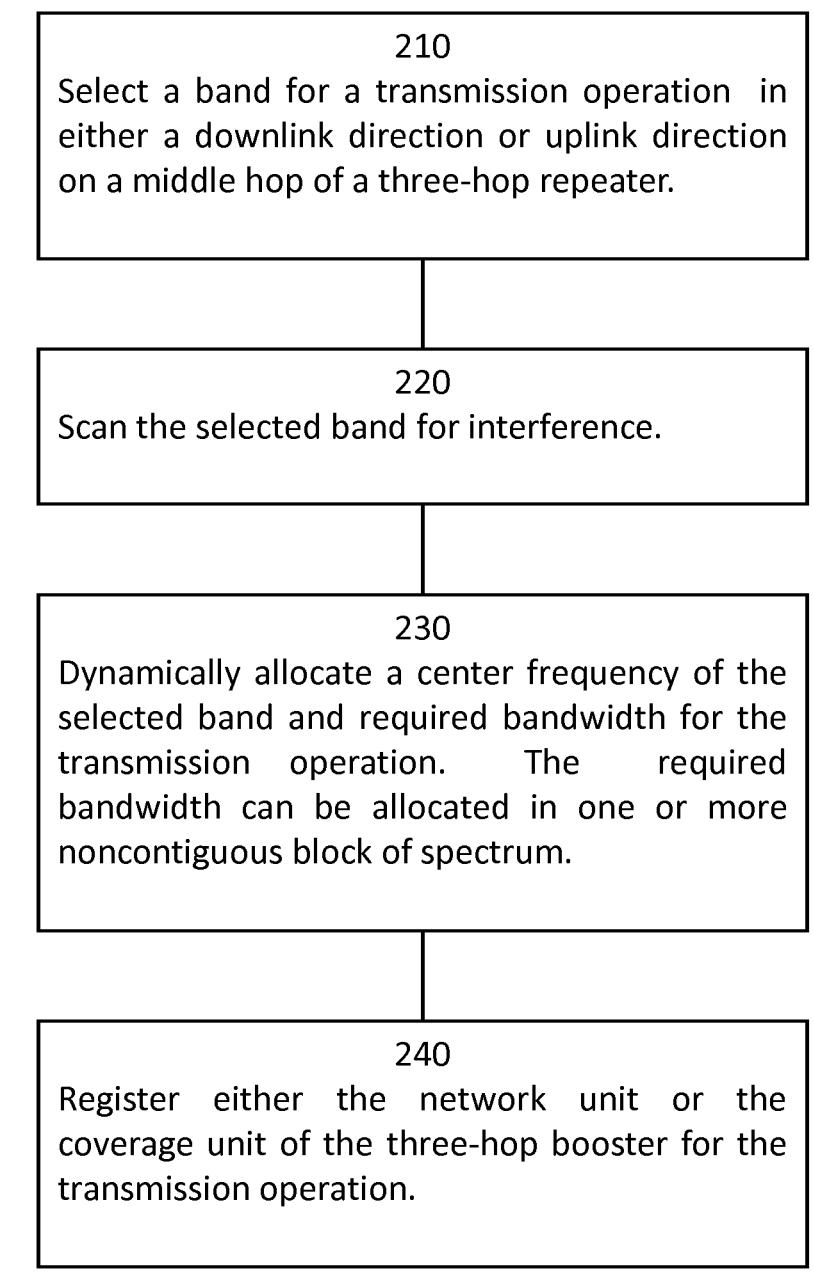
FIG. 2 shows an exemplary method for assigning frequency resources.

FIG. 2 shows an exemplary method 200 for assigning frequency resources in a booster system. In this method 200, the system described is similar to that shown in FIG. 1, and is, for example, a three-hop repeater. In either a downlink direction or an uplink direction on the middle hop of the three-hop repeater, in which the middle hop is between a network unit (i.e. donor unit or element) and a coverage unit (i.e. server unit or element), a band is selected for a transmission operation, in 210. In some implementations, the band is selected from an unlicensed or general use band of frequencies. Once a band is selected for the transmission operation, the selected band is scanned for interference, in 220. In this way, the system can select the band that yields the best signal, as described above with respect to FIG. 1. Following scanning the band for interference, an allocation of a center frequency of the selected band can be made dynamically, and the required bandwidth can also be allocated at this time, in 230. For example, dynamic allocation can mean that the actual frequencies used on link 120 could be different every time the spectrum is allocated based on changing interfering conditions and spectrum bandwidth requirements. In each allocation, the system can make a spectrum and bandwidth allocation that will optimize the overall system performance. The required bandwidth can be allocated in one or more noncontiguous blocks of spectrum. The system also registers either the network unit or the coverage unit for the transmission operation, in 240, as required.

For example, when spectrum is dynamically allocated and the total potential relay bandwidth is larger than the available spectrum on the middle hop of a three hop repeater, more frequency resources can be available to relay signals in the downlink direction than in the uplink direction on the middle hop of the repeater. As such, as much frequency resources as possible can be allocated to the downlink direction as this would allow the largest number of handsets to receive signal coverage. In the uplink direction, frequency resources are only required when an uplink transmission is in progress and hence the allocation of frequency resources can be made dynamically. However, if no frequency allocation can be made in the uplink direction, such as due to lack of available interference free spectrum, the allocated frequency resources in the downlink direction can be de-allocated and relaying of the paired downlink spectrum can be stopped in order to prevent different path loss between the base station and the handset in the uplink and downlink directions.

Figure 3:
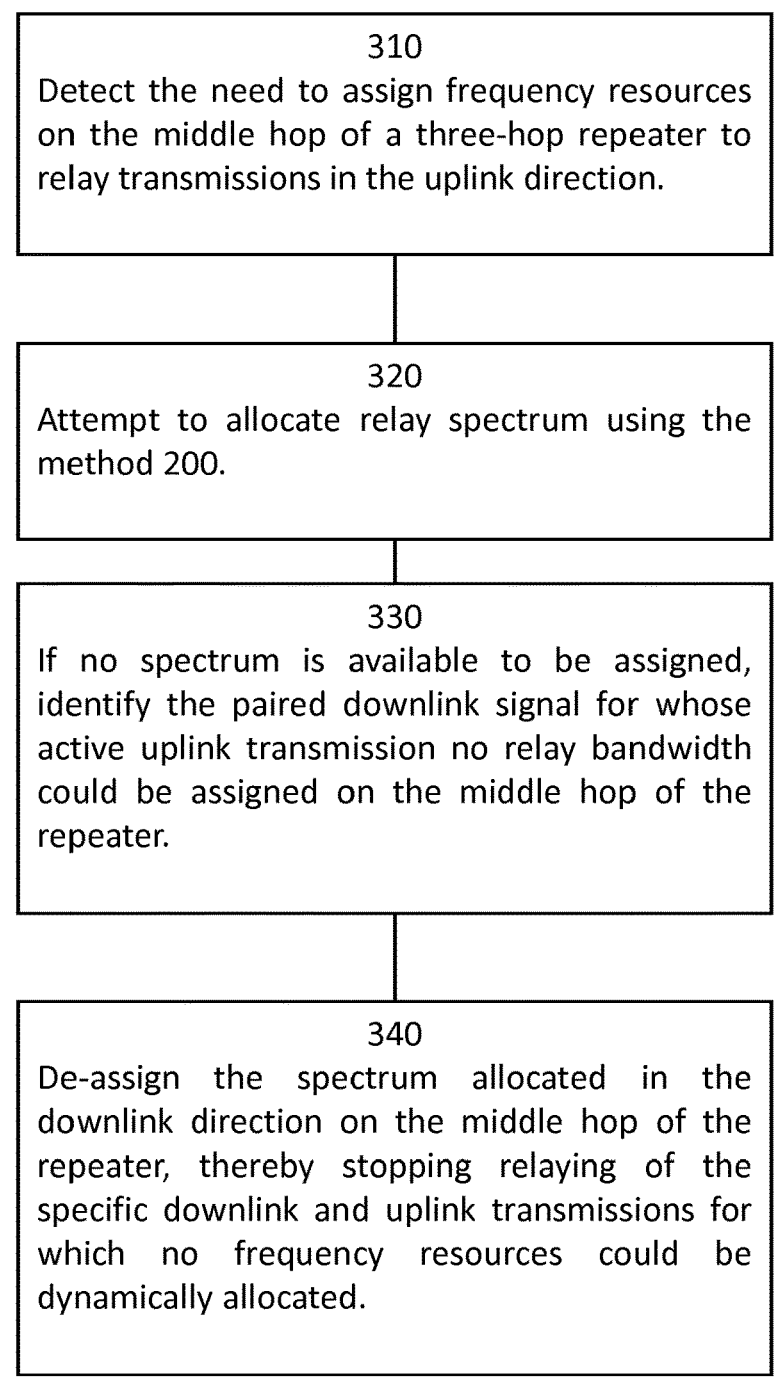
FIG. 3 shows an exemplary method for de-assigning frequency resources.

FIG. 3 shows an exemplary method 300 for de-assigning frequency resources in a booster system. In this method 300, the system described is similar to that shown in FIG. 1, and is, for example, a three-hop repeater. The three-hop repeater can detect the need for uplink frequency resources by detecting the start of an uplink transmission on an uplink frequency in 310. The repeater can attempt to dynamically allocate spectrum to relay the uplink transmission using a method such as the one described in 200. If no spectrum is available to relay the uplink transmission, the paired downlink signal can be identified, as in 330. As shown in 340, the downlink frequency resources can be de-allocated and the downlink relaying can be stopped.

Although a few embodiments have been described in detail above, other modifications are possible. Other embodiments may be within the scope of the following claims.

What is claimed is:

1. A method of assigning frequency resources in a wireless communication booster, in either a downlink direction or uplink direction on a middle hop of a three-hop repeater, the middle hop being between a network unit and a coverage unit both contained within an enclosure of the wireless communication booster, the method comprising:
   selecting a transmission band for a transmission operation on the middle hop of the three-hop repeater, the middle hop being within the enclosure, the transmission band being selected from an unlicensed or general use band of frequencies;
   scanning the transmission band for interference to the transmission operation;
   dynamically allocating a center frequency and a required bandwidth for the transmission operation within the transmission band, the allocation being based on a lowest interference within the transmission band, wherein frequency resources are allocated in the downlink direction of the middle hop;
   deallocating, in response to a detected need of frequency resources in the uplink direction of the middle hop, a portion of frequency resources allocated in the downlink direction; and
   allocating the deallocated portion of frequency resources to the uplink direction.

2. The method in accordance with claim 1, wherein the middle hop of the three-hop repeater uses an unlicensed or general use band of frequencies.

3. The method in accordance with claim 1, wherein the middle hop of the three-hop repeater uses a licensed band of frequencies that requires registration of either the network unit or coverage unit for the transmission operation.

4. The method in accordance with claim 2, wherein the required bandwidth is allocated in one or more noncontiguous blocks of spectrum of the unlicensed or general use band of frequencies.

5. A method of dynamically assigning frequency resources in a wireless communication booster in an uplink direction on a middle hop of a three-hop repeater, the middle hop being between a network unit and a coverage unit both contained within an enclosure of the wireless communication booster, the method comprising:
   detecting a need to assign frequency resources based on a detection of uplink traffic on the middle hop of the three-hop repeater, the middle hop being within the enclosure;
   selecting a transmission band for a transmission operation on the middle hop of the three-hop repeater, the transmission band being selected from an unlicensed or general use band of frequencies;
   scanning the transmission band for interference to the transmission operation; and
   dynamically allocating a center frequency and a required bandwidth for the transmission operation within the transmission band, the allocation being based on a lowest interference within the transmission band;
   wherein frequency resources are allocated in a downlink direction of the middle hop;
   wherein a portion of frequency resources allocated in the downlink direction are deallocated from the downlink direction in response to the detected need to assign frequency resources in the uplink direction of the middle hop; and wherein the deallocated portion of frequency resources in the downlink direction of the middle hop is assigned to the uplink direction.

6. The method in accordance with claim 5, wherein the middle hop of the three-hop repeater uses an unlicensed or general use band of frequencies.

7. The method in accordance with claim 5, wherein the middle hop of the three-hop repeater uses a licensed band of frequencies that requires registration of either the network unit or coverage unit for the transmission operation.

8. The method in accordance with claim 6, wherein the required bandwidth is allocated in one or more noncontiguous blocks of spectrum of the unlicensed or general use band of frequencies.

9. A method for dynamically de-assigning frequency resources in a wireless communication booster in a downlink direction on a middle hop of a three-hop repeater of the wireless communication booster, the middle hop being between a network unit and a coverage unit for boosting and relaying signals between the network unit and the coverage unit, both the network unit and the coverage unit being contained within an enclosure of the wireless communication booster, the method comprising:

detecting a need to assign frequency resources in an uplink direction based on a detection of uplink traffic on the middle hop of the three-hop repeater, the middle hop being within the enclosure, the frequency resources being assigned from an unlicensed or general use band of frequencies;

if no additional frequency resources are available in the uplink direction for a transmission operation on the middle hop of the three-hop repeater, finding frequency resources currently assigned in the downlink direction to relay a downlink signal for whose paired uplink transmission no frequency resources were available; and de-assigning the frequency resources in the downlink direction so that the downlink signal is no longer boosted;

wherein frequency resources are allocated in the downlink direction;

wherein the frequency resources in the downlink direction are de-assigned from the downlink direction in response to the need to assign frequency resources in the uplink direction of the middle hop; and wherein the de-assigned frequency resources in the downlink direction are allocated to the uplink direction.

10. The method in accordance with claim 9, wherein the middle hop of the three-hop repeater uses an unlicensed or general use band of frequencies.

11. The method in accordance with claim 9, wherein the middle hop of the three-hop repeater uses a licensed band of frequencies that requires registration of either the network unit or coverage unit for the transmission operation.

12. The method in accordance with claim 10, wherein a required bandwidth is allocated in one or more noncontiguous blocks of spectrum of the unlicensed or general use band of frequencies.

* * * * *